United States Patent
Jones

(10) Patent No.: US 7,987,112 B2
(45) Date of Patent: Jul. 26, 2011

(54) METHOD AND SYSTEM OF UTILIZING PRINT DEVICE CONSUMPTION INFORMATION FOR PRICING AND SERVICE

(75) Inventor: Brent Rodney Jones, Sherwood, OR (US)

(73) Assignee: Xerox Corporation, Norwalk, CT (US)

( * ) Notice: Subject to any disclaimer, the term of this patent is extended or adjusted under 35 U.S.C. 154(b) by 979 days.

(21) Appl. No.: 11/857,809

(22) Filed: Sep. 19, 2007

(65) Prior Publication Data

US 2009/0073475 A1    Mar. 19, 2009

(51) Int. Cl.
*G06Q 30/00* (2006.01)
(52) U.S. Cl. .................................................. 705/14.1
(58) Field of Classification Search ............... 385/1.15; 705/14, 14.1, 14.26; 358/1.12, 1.15
See application file for complete search history.

(56) References Cited

U.S. PATENT DOCUMENTS

| | | | |
|---|---|---|---|
| 5,802,420 A * | 9/1998 | Garr et al. ........................ 399/27 |
| 6,940,613 B1 | 9/2005 | Beard et al. |
| 7,231,153 B2 | 6/2007 | May |
| 2002/0194064 A1 * | 12/2002 | Parry et al. ...................... 705/14 |
| 2003/0046171 A1 * | 3/2003 | Whale ............................... 705/26 |
| 2003/0065766 A1 * | 4/2003 | Parry ............................. 709/224 |
| 2003/0086110 A1 * | 5/2003 | Parry ............................. 358/1.14 |
| 2003/0128991 A1 | 7/2003 | Carling et al. |
| 2003/0172086 A1 * | 9/2003 | Parry ........................... 707/104.1 |
| 2004/0138945 A1 * | 7/2004 | Adkins et al. ................... 705/14 |
| 2004/0215468 A1 | 10/2004 | Doeberl et al. |
| 2005/0147440 A1 * | 7/2005 | Nakanishi et al. ............. 400/62 |
| 2006/0120735 A1 * | 6/2006 | Adkins et al. ................... 399/12 |
| 2006/0190324 A1 * | 8/2006 | Adkins et al. ................... 705/14 |
| 2006/0221387 A1 * | 10/2006 | Swift et al. ..................... 358/1.15 |
| 2008/0231883 A1 | 9/2008 | Snyder |
| 2008/0243606 A1 | 10/2008 | Snyder et al. |

FOREIGN PATENT DOCUMENTS

EP             1118932 A2      7/2001

* cited by examiner

*Primary Examiner* — John G. Weiss
*Assistant Examiner* — Bennett Sigmond
(74) *Attorney, Agent, or Firm* — Pepper Hamilton LLP

(57) ABSTRACT

A method of providing a discount may include monitoring at least one resource via a communication network. A usage profile may be received from the at least one resource. The usage profile may include a measurement of consumption of a consumable over a period of time for the at least one resource. A first factor may be determined based on the usage profile. A second factor may be determined based on one or more of an ownership level and a participation level of the at least one resource. A discount for a future purchase may be provided based on the first factor and the second factor.

19 Claims, 2 Drawing Sheets

FIG. 1
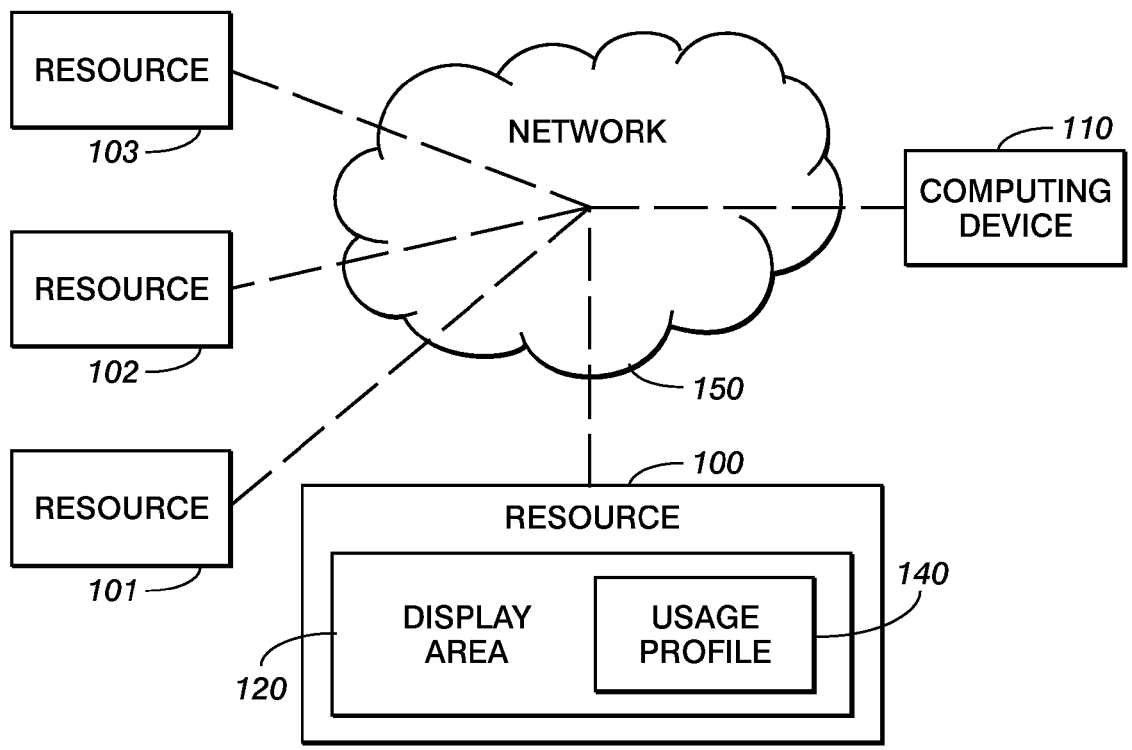
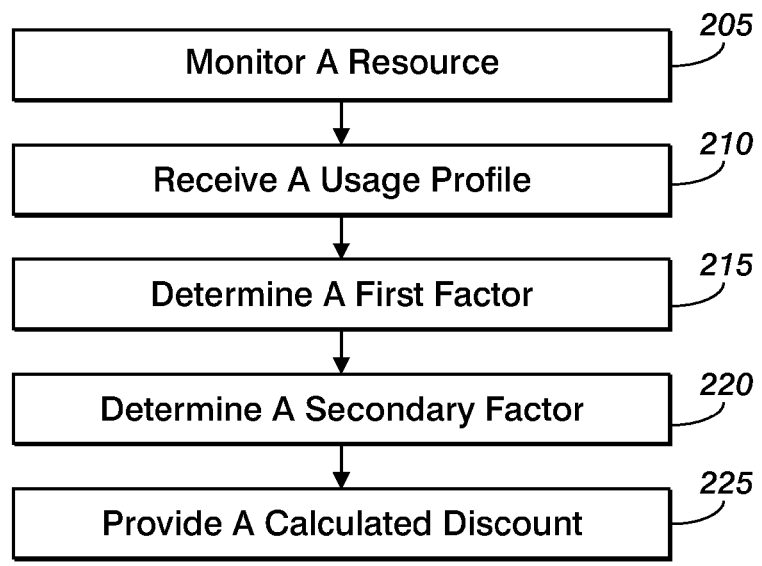
FIG. 2

METHOD AND SYSTEM OF UTILIZING PRINT DEVICE CONSUMPTION INFORMATION FOR PRICING AND SERVICE

BACKGROUND

A reward or loyalty system is a type of marketing method which can be used to encourage certain types of behavior. Often a reward or loyalty system is implemented by a store to promote customer purchases. Customers can be rewarded for continuing to buy items at that store. Rewards can be provided based on a customer's purchase history. For example, after a consumer purchases items totaling a certain monetary amount, a customer could be given a reward.

Rewards can vary based on the products or services rendered. An exemplary reward could be for a free item or a free service. A reward could include a discount on a future purchase. In some cases, rewards are cumulative in nature to encourage customers to obtain larger rewards as a result of increased spending.

Rewards are used in the printing industry to encourage consumption of printing supplies. A reward can be provided based on a customer's volume of purchases for consumables such as ink or paper. U.S. Patent Application Publication No. 2004/0138945 to Adkins et al. teaches determining item consumption for a customer and providing a reward based on a customer's usage.

SUMMARY

In an embodiment, a method of providing a discount for a resource consumable includes monitoring at least one resource via a communication network and receiving from the resource a usage profile including a measurement of consumption of a consumable over a period of time for the resource. The method also includes determining a first factor based on the usage profile, determining a second factor based on one or more of an ownership level and a participation level for a user of the resource, and providing the user with a discount for a future purchase based on the first factor and the second factor.

In an alternate embodiment, a system for providing a discount for a resource consumable includes at least one resource having a usage profile, a communication network, and a computing device. The computing device may be configured to monitor the at least one resource via the communication network. The computing device receives a usage profile based on consumption of a consumable over a period of time for the resource, determines a first factor based on the usage profile, determines a second factor based on one or more of an ownership level and a participation level of the resource, and provides a user with a discount for a future purchase of the consumable based on the first factor and the second factor.

In an alternate embodiment, a method of providing a discount for a print device consumable includes monitoring at least one print device via a communication network, and receiving a usage profile including a measurement of consumption of a consumable over a period of time for the print device. The method includes determining a first factor based on the usage profile, determining a second factor based on one or more of an ownership level and a participation level for a user of the print device, and providing the user with a discount for a future purchase based on the first factor and the second factor.

BRIEF DESCRIPTION OF THE DRAWINGS

Aspects, features, benefits and advantages of the embodiments described herein will be apparent with regard to the following description, appended claims, and accompanying drawings where:

FIG. 1 illustrates an exemplary consumable discount system according to an embodiment.

FIG. 2 depicts a flowchart of a first exemplary method of determining a discount based on consumption of a consumable according to an embodiment.

DETAILED DESCRIPTION

Figure 3:
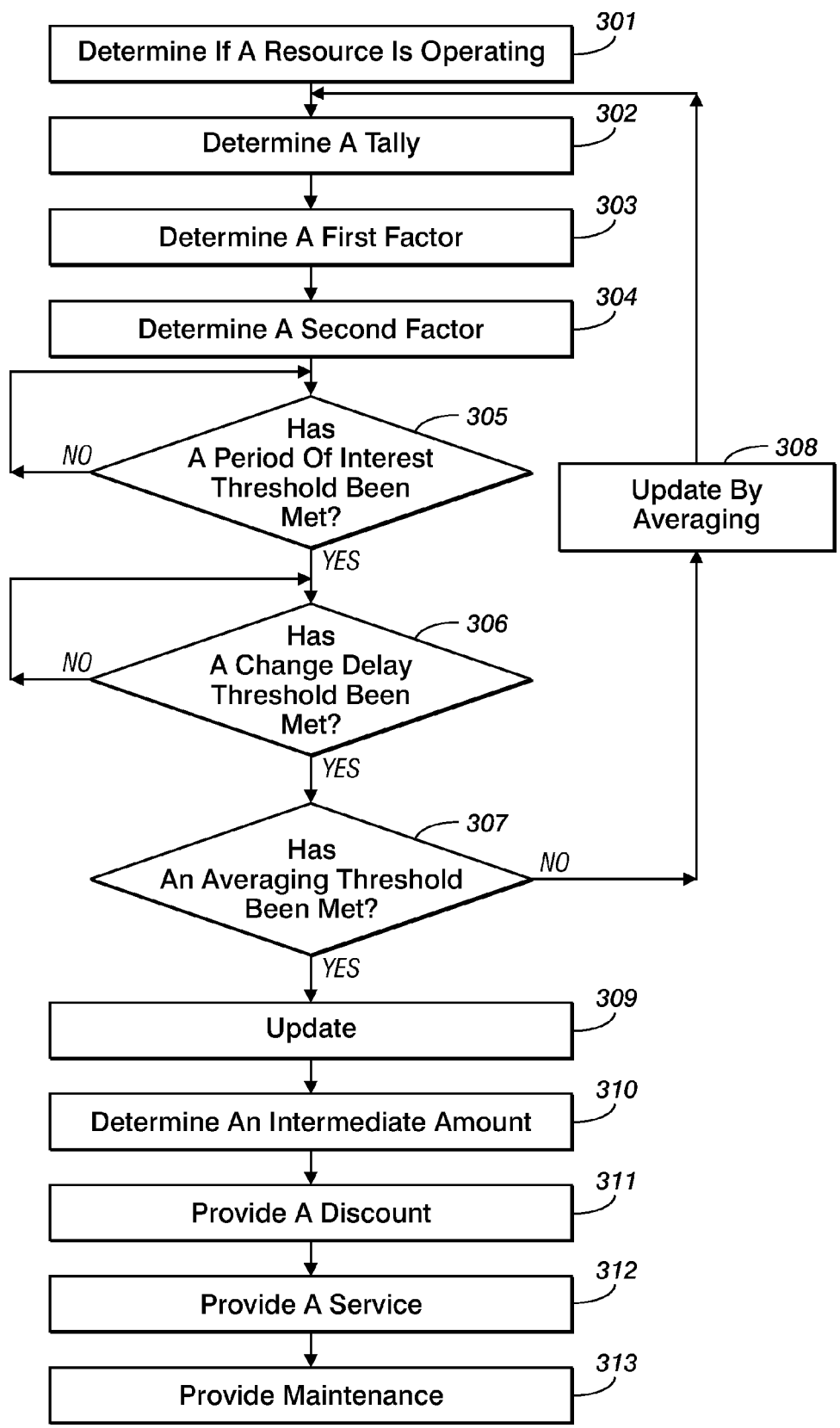
FIG. 3 depicts a flowchart of a second exemplary method of determining a discount based on consumption of a consumable according to an embodiment.

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

As used herein and in the appended claims, the singular forms "a," "an," and "the" include the plural reference unless the context clearly dictates otherwise. Thus, for example, reference to a "document" is a reference to one or more documents and equivalents thereof known to those skilled in the art, and so forth. Unless defined otherwise, all technical and scientific terms used herein have the same meanings as commonly understood by one of ordinary skill in the art. As used herein, the term "comprising" means "including, but not limited to."

A "resource" or "print resource" is a device that generates printed material, such as a document, either by itself or in coordination with other resources. A resource may include, but is not limited to, a print device, a multifunction device, a router, a web server used in connection with a print device and/or other devices. A print device is an electronic device that is capable of receiving commands, printing text and/or images on a substrate and/or scanning a document. Print devices may include, but are not limited to, network printers, production printers, copiers, facsimile machines, other devices using ink or toner, and/or scanners. As used herein, the words ink and toner are used interchangeably to refer to wet or dry material that forms an image or text on a substrate. Print devices may also perform a combination of functions such as printing/scanning/copying/faxing, in which case such devices may be considered to be multifunctional devices.

A "consumable" is a product that may be depleted or worn out by use. A consumable within a resource may include, but is not limited to, ink or an ink cartridge, toner or a toner cartridge, a printer head, and/or paper. As used herein, the words "ink" and "toner" are used interchangeably to refer to wet or dry material that forms an image or text on a substrate.

A "pixel" is the individual ink drop ejected from a print head onto an image forming surface. For offset printing, the ink may be ejected onto a drum or alternate device used for offset printing.

A "total" refers to the result of one or more mathematical operations performed using two or more factors. In an embodiment, a mathematical operation may include a sum, a difference, a product, a division, and/or any other operation performed using at least one factor.

"A usage profile" is data that reflects usage of a consumable by a resource. A usage profile may be kept for a device for a pre-specified time period.

A "user" is an owner, administrator or other person using a resource. A user may include a person who requested a print job, such as a customer.

A "computing device" processes data to perform one or more functions. The computing device may be any processor-based device. A computing device may also include, but is not limited to, a server, a personal computer, a personal digital assistant, a web-enabled phone, a smart terminal and/or a dumb terminal, and/or any other electronic device capable of communicating in a networked environment.

A "display area" is an electronic changeable device that represents information in visual form. A display area may include, but is not limited to, a liquid crystal display (LCD), a plasma display, a digital light processing (DLP) display and/or a light-emitting diode (LED) display.

FIG. 1 illustrates an exemplary consumable discount system according to an embodiment. As shown in FIG. 1, the system may include one or more resources, such as 100-103. The one or more resources 100-103 may be in communication with a computing device 110 via a network 150, such as a local area network (LAN), a wide area network (WAN), the Internet, a universal serial bus (USB) network, a Bluetooth network and/or any other communications network. For example, a transfer network may encompass alternate communication steps. In an embodiment, a provision may be made for printing or visually displaying encoded information that can be verbally or otherwise conveyed with manual assistance in place of electronic communication if a digital transfer network component or system is not utilized or is unavailable or impaired.

In an embodiment, a resource 100 may include a display area 120. The display area 120 may be used to display a usage profile 140. The usage profile 140 may include a number, letter, graph, chart, symbol, and/or any other displayable image.

FIG. 2 depicts a flowchart of a first exemplary method of determining a discount based on consumption of a consumable according to an embodiment. The usage of a consumable by a resource may be monitored 205 via a communication network. For example, a consumable in a resource may be monitored 205 by a counter or other calibration device.

A usage profile may include a measurement of consumption of the consumable by the resource and may be received 210 by a computing device. In an embodiment, the usage profile may be stored by the resource. In an alternate embodiment, the usage profile may be stored by the computing device. In an embodiment, the computing device may receive the usage profile directly from the resource. In an alternate embodiment, the computing device may receive the usage profile indirectly through manual input and/or an electronic transfer.

In an embodiment, the usage profile may indicate the usage of a consumable by a resource at any particular time. In an embodiment, the usage profile may be based on the consumption of a consumable by a resource over a period of time. The usage profile may be determined by an algorithm which may include, but is not limited to, a measurement of usage of a consumable by at least one resource.

In an embodiment, the usage profile may measure consumption of a consumable. A consumable may include, but is not limited to, ink or an ink cartridge, toner or a toner cartridge, a printer head, and/or paper. In an embodiment, the usage profile may include a relative monitoring of the volume of ink consumption against an ink identification and/or volume history log maintained by a print device for ink that may be inserted or loaded. Ink consumption may include, but is not limited to, an amount of black ink consumed, an amount of color ink consumed, an amount of toner coverage per page printed and/or other ink consumption information. Toner coverage may refer to the percentage of a printed sheet that is covered in toner.

In an embodiment, a usage profile may be determined by a customer replaceable unit monitor (CRUM). A CRUM may be a processor readable storage medium. A CRUM may be included in the packaging or housing of a consumable and monitor the use of the consumable, such as a print cartridge monitor. Examples or such arrangements may be found in, for example, U.S. Pat. Nos. 6,940,613 and 7,231,153. In an embodiment, a CRUM may store information about one or more machines in which the consumable has been installed. In an embodiment, data from a CRUM may be read during or after a consumable is used in one or more machines. Data from the CRUM may be used to generate the usage profile.

In an embodiment, the usage profile may include an ink mass that is determined by multiplying a pixel count by a pixel mass. A pixel mass may be determined by averaging a mass of ink ejected from a print head over a number of pixels in the printed document. In an embodiment, the usage profile may pertain to a single resource. In an embodiment, the usage profile may pertain to a plurality of resources using aggregated usage information.

Statistical information may be generated based on the usage profile over a time period. A first value may be determined using the statistical information. Exemplary first values may be determined by comparing an amount of color ink used by a resource to an amount of black ink used by the resource, comparing a current image density of a resource to a target image density, and/or determining an average number of images created by a resource over a predetermined time period. The first value may be compared to a first threshold value to determine 215 a first factor to be used in the determination of a discount.

For example, a resource may have printed 1000 pages using black ink, but only 200 pages using colored ink, in a month. The statistical information may include the number of pages printed using colored ink and black ink, and the first value may equal the ratio of the number of pages printed using color ink to the number of pages printed using black ink. In this example, the first value may equal 0.2 (200/1000).

The first value may be compared with a first threshold value to determine 215 a first factor. In an embodiment, the first threshold value may be a single preselected value. Alternatively, the first threshold value may be random, pseudorandom, or a calculated number. For example, the first threshold value may be a single number such as 0.5. If the first value does not exceed the first threshold value, the first factor may equal zero.

In an alternate embodiment, there may be multiple first threshold values. For example, the first factor may be 5% if a first value is between about 0.1 and about 0.3, inclusive, and 10% if the first value is between about 0.31 and about 0.5 inclusive. In an embodiment, the first factor may be based on a previous factor received by a user. For example, if the first value increases by 0.1 from a previously determined first value, the first factor may be 5%.

In an embodiment, a second factor for calculating a discount may be determined 220. The second factor is based on a non-consumable aspect of the resource. A second factor is not based on the usage profile, but rather on the resource itself or the user's configuration of the resource and/or related resources. In an embodiment, the second factor may be determined by comparing a second value to a second threshold value. For example, the second value may be based on an ownership level and/or a participation level of at least one resource. An ownership level may include, but is not limited to, a number of resources owned, a number of locations where resources are located and a number of resources at a location. A participation level may include, but is not limited to, a percentage of programs in which a customer participates, such as incentive programs, surveys, beta site programs and product evaluations, a level of customer participation in metered print usage programs and/or a volume of direct communication to a resource. In an embodiment, a participation level may also include a percentage or level of compliance with maintenance recommendations and service request histories. The second factor may be used to increase or decrease the first factor to determine a discount.

The second factor for determining a discount may be determined by comparing the second value to a second threshold value. In an embodiment, the second factor may be a positive or negative number. In an embodiment, if a second value is greater than a second threshold value, the second factor may be positive. In an embodiment, if a second value is less than a second threshold value, the second factor may be negative.

The second factor may be determined by comparing the amount of resources owned by a corporation in a specific location to the total amount of resources owned by the corporation in all locations. The second value may be compared with the second threshold value to determine the second factor. In an embodiment, a second threshold value may be a single preselected number. Alternatively, the second threshold value may be random, pseudorandom, or a calculated number. In an embodiment, a second threshold value may be a range of numbers.

The second value may be the percentage of customer participation in a program. For example, the second value may be 65%. There may be multiple second threshold values. For example, a second value of 0-25% may result in a −5% second factor; a second value of 25-50% may result in no second Factor; a second value of 50-75% may result in a 5% second factor; and a second value of 75-100% may result in a 15% second factor. Therefore, if the second value is 65%. The second factor may be 5%.

The discount for a consumable may be provided 225 based on the first factor and the second factor. In an embodiment, the discount for a consumable may be a total determined based on the first factor and the second factor. In an embodiment, the total may be determined by the product of first factor and the second factor. In an embodiment, the total may be determined by the sum of the first factor and the second factor. Alternate and/or additional operations may be performed to determine the total within the scope of this disclosure.

In an embodiment, if the total determined based on the first factor and the second factor is negative, no discount may be applied. In an alternate embodiment, if the total determined based on the first factor and the second factor is negative, a "negative discount" may be applied, such that the cost of the consumable for the resource may increase. In an embodiment, a negative factor may be made positive to determine a positive total. For example, a first factor may be approximately 0.92. A second factor may be approximately −0.95. Instead of using the negative second factor, the absolute value of the inverse of the second factor, $$\left|\frac{1}{-.95}\right| = 1.0526,$$

may be used. As such, the product of the first factor and the modified second factor may be 0.9684.

In an embodiment, the system may determine whether to apply the total to discount a user's purchase price. In an embodiment, a subsequent purchase price of a consumable may be based on prior usage volume of the consumable over a particular time period. In an embodiment, the discount may be applied only to a type or category of consumables if the total surpassed a threshold. For example, a discount may only apply to a type of consumable such as consumables in the general ink category or specific sub-categories of ink. Alternately, a discount may only apply to black ink purchases based on black ink consumption or to colored ink purchases based on colored ink consumption.

In an embodiment, a particular consumable may be used to establish a discount or a reward for a consumable a type of consumable, and/or other products and/or services. In an embodiment, the discount earned by some criteria, such as ink usage, may be applicable only for a particular consumable or towards an ownership cost. For example, the discount may only be applied to the purchase of a new or replacement part, a new or replaceable consumable or product, and/or a service. In an embodiment, the discount may be applied to one or more services such as maintenance operations.

FIG. 3 depicts a flowchart of a second exemplary method of determining a discount based on consumption of a consumable according to an embodiment. The system may determine 301 whether a resource is operating. In an embodiment, a computing device may determine 301 whether a resource is operating by monitoring the resource.

A tally may be determined 302, for example, by the resource or the computing device. In an embodiment, the tally may indicate the usage of a consumable of a resource from a starting time to the present time. In an embodiment, the tally may be used to determine a usage profile. In an embodiment, there may be multiple tallies. For example, there may be a first tally of the color use discount and a second tally of the image volume discount.

Statistical information may be generated based on the tally. A first value may be determined using the statistical information. For example, a first value may be determined by comparing an amount of color ink coverage to an amount of black ink coverage. The first value may be compared with one or more first threshold values to determine 303 a first factor. A first threshold value may be a random, a pseudorandom or a calculated number. In an embodiment, there may be multiple first factors based on the multiple tallies.

In an embodiment, a second factor may be determined 304. The second factor is based on a non-consumable aspect of the resource. In an embodiment, the second factor may be determined by comparing a second value to a second threshold value. The second value may be compared with one or more second threshold values to determine 304 the second factor. The second value may include information that is not based on the usage profile of the resource. A second value may be based on one or more of an ownership level and a participation level of at least one resource. An ownership level may include, but is not limited to, a number of resources owned, a number of locations where resources are located and a number of resources at a location. A participation level may include, but is not limited to, a percentage of customer participation in an incentive program, a level of customer participation in metered programs and a volume of direct communication to a resource. A second factor may be used to increase or decrease the first factor to determine a discount.

The system may determine 305 whether a period of interest threshold has been met. In an embodiment, a period of interest may be a time interval between discounts. In an embodiment, a period of interest may be a time interval between discount percentage reassessments. A discount percentage reassessment may occur when an updated discount rate is executed by a purchase or other granted benefit. The time interval may be a year, six months, a quarter of a year, a calendar month, or a specified number of days, such as 60. In an embodiment, the period of interest may be arrived at by agreement with a customer or manufacturer. In an embodiment, the period of interest may be defined by a manufacturer and may or may not be disclosed.

If the period of interest threshold has not been met, the system may again determine 305 whether the period of interest threshold has been met after a period of time has passed. The period of time may be a preselected, random or pseudo-random period of time.

If the period of interest threshold has been met, the system may determine 306 whether the change delay threshold has been met. The change delay is a delay in offering a new discount rate based on factors contributing to the discount. In an embodiment, the change delay may be a delay in offering a new discount rate based on the most recent factors. In an embodiment, the change delay may be zero, and therefore no delay may be applied. In an embodiment, a change delay may permit a customer to purchase at an earlier, more favorable rate. If the change delay threshold has not been met, the system may again determine 306 whether the change delay threshold has been met after a period of time has passed.

If the change delay threshold has been met, the system may determine 307 whether an averaging threshold has been met for an averaging term. In an embodiment, the averaging term may be determined by averaging the discount rates over a number of periods of interest. Pricing and/or benefits may become more stable as the number of periods of interest increase because there may be less variation in the discount. In an embodiment, the number of periods of interest may be decreased to increase the incentive to use a particular product in favor of alternatives. For example, the averaging term may be a single period of interest to increase a customer's incentive to use a particular type of colored ink.

If the averaging threshold is not met, the system may be updated 308 by averaging discounts from the total number of periods of interest since a product or consumable was purchased or installed. In an embodiment, the system may be updated 308 by altering the number of periods of interest used to determine an average. The system may determine 302 a new tally and perform the above process for the new tally.

If the averaging threshold is met, the system may be updated 309. Updating 309 the system may include, but is not limited to, setting a new period of interest, setting a new change delay term, and updating the system to include the first factor and the second factor.

In an embodiment, an intermediate value may be determined 310 based on the combination of the first factor and the second factor. The intermediate value may be compared with one or more bucket thresholds to provide 311 a discount. For example, a first bucket threshold may include intermediate values greater than or equal to 97%, a second bucket threshold may include intermediate values less than 97%, but greater than or equal to 94%, a third bucket threshold may include intermediate values less than 94%, but greater than or equal to 91% and a fourth bucket threshold may include intermediate values less than 91%, but greater than or equal to 88%. Each bucket threshold may be associated with a discount. The first bucket may have a discount of 98%, the second bucket may have a discount of 95%, the third bucket may have a discount of 92%, and the fourth bucket may have a discount of 89%. Therefore, if the intermediate value is 96% percent, the intermediate value may exceed the second bucket threshold of 94% and may have a discount of 95%.

In an embodiment, one or more of the factors may be used to calculate a value. In an embodiment, the value may be rounded to a digit instead of comparing the discount to a bucket threshold. For example, a value for a discount rate from the first factor may be 0.9650. The first factor may be multiplied by a second factor, which may be 0.8840. Therefore, the resulting discount rate may be 0.85306 or 85.306%. In an embodiment, the discount may vary based on time, participants and/or usage history.

In an embodiment, the discount for a consumable may be provided 311. In an embodiment, the discount may be determined using bucket thresholds. In an embodiment, the discount for a consumable may be a total determined based on the first factor and the second factor. In an embodiment, if the second factor is negative, it may not reduce the first factor but may be disregarded. In an embodiment, if a total determined based on the first factor and the second factor is negative, no discount may be applied. In an embodiment, if a total determined based on the first factor and the second factor is positive, the total may be the amount of the discount. In an embodiment, the total determined may be based on the sum of the factors. In an embodiment, the total determined may be based on the product of the factors. In an embodiment, a negative factor may be made positive to determine a positive total. For example, instead of using a negative factor, the absolute value of the inverse of the factor may be used.

The discount may be applied to a future purchase of the consumable. In an embodiment, a service may be provided 312 for the resource. The type of service provided may be determined based on the discount. In an embodiment, maintenance operations may be provided 313 for the resource. The type of maintenance provided may be based on the discount.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of providing a discount for a print resource consumable, comprising:
    monitoring, by a computing device, at least one print resource via a communication network;
    receiving, by the computing device, a usage profile from the at least one print resource, wherein the usage profile comprises a measurement of average consumption of a consumable per sheet printed over a period of time for the at least one print resource;
    determining, by the computing device, a first factor based on the usage profile;
    determining, by the computing device, a second factor based on a print resource ownership level for a user of the at least one print resource;
    determining whether the first factor exceeds a first threshold value;
    determining whether the second factor exceeds a second threshold value; and
    based on both the first factor exceeding the first threshold value and the second factor exceeding a second threshold value, providing the user with a discount for a future purchase.

2. The method of claim 1 wherein:
   determining the first factor also comprises determining a ratio of color ink coverage to black ink coverage during a predetermined time period; and
   providing the user with the discount is also based on the ratio exceeding a threshold value.

3. The method of claim 1, further comprising:
   applying the discount to a price for a replacement part.

4. The method of claim 3 wherein the print resource comprises at least one of the following: a printer, a scanner, a copier, and a facsimile machine.

5. The method of claim 1 wherein determining the second factor comprises:
   determining the print resource ownership level based on one or more considerations comprising one or more of the following: a number of resources owned by the user, a number of locations of the user where resources are located, and a number of resources at a location of the user.

6. The method of claim 5, wherein determining the second factor is also based on a participation level for the user, wherein the participation level comprises a level of customer participation in metered print usage programs.

7. The method of claim 1, further comprising: providing the user with a service for the at least one print resource.

8. The method of claim 7, further comprising: providing the user with maintenance for the at least one print resource.

9. The method of claim 1, further comprising:
   determining whether a threshold time interval between discounts is met; and
   wherein the providing is also based on the threshold time interval having been met.

10. The method of claim 9, further comprising:
    determining whether a change delay threshold is met;
    based on the change delay threshold having been met, determining a discount level; and
    wherein the providing comprises providing the discount at the discount level.

11. The method of claim 10, further comprising:
    determining whether an averaging threshold is met; and
    based on the averaging threshold having been met, modifying the discount level before providing the discount to the user.

12. The method of claim 1 further comprising:
    determining an intermediate value based on the first factor and the second factor;
    comparing the intermediate value with a plurality of bucket thresholds; and
    determining the discount based on the comparing.

13. The method of claim 1, further comprising:
    monitoring, by a customer replaceable unit monitor that is installed in a consumable housing within the resource, consumable usage data;
    storing by the customer replaceable unit monitor, the data in a processor readable storage medium; and
    generating, by the customer replaceable unit monitor, the usage profile based on the data.

14. A system for providing a discount for a print resource consumable comprising:
    a print resource;
    a customer replaceable unit monitor that is installed in a housing of a consumable within the resource, the customer replaceable unit monitor having a storage medium that stores a usage profile for the consumable;
    a communication network; and
    a computing device configured to:
       monitor the print resource via the communication network, receive the usage profile from the customer replaceable unit monitor wherein the usage profile is based on average consumption of the consumable per sheet printed over a period of time for the print resource,
       determine a first factor based on the usage profile,
       determine a second factor based on an ownership level of the print resource, and
       based on a determination that the first factor exceeds a first threshold value and the second factor exceeds a second threshold value, provide a user with a discount for a future purchase of the consumable.

15. A method of providing a discount for a print device consumable, comprising:
    monitoring at least one print device via a communication network;
    receiving, by a computing device, a usage profile from the at least one print device, wherein the usage profile comprises a measurement of consumption of a consumable per sheet printed over a period of time for the at least one print device;
    determining, by the computing device, a first factor based on the usage profile;
    determining, by the computing device, a second factor based on an ownership level for a user of the at least one print device;
    determining whether the first factor exceeds a first threshold value;
    determining whether the second factor exceeds a second threshold value; and
    based on results of each of the determining steps, providing the user with a discount for a future purchase.

16. The method of claim 15 wherein:
    determining the first factor also comprises determining a ratio of color ink coverage to black ink coverage during a predetermined time period; and
    providing the user with the discount is also based on the ratio exceeding a threshold value.

17. The method of claim 15, wherein:
    the results of each of the determining steps are negative values; and
    providing the user with a discount comprises providing a negative discount such that a cost of a future purchase of the consumable is increased.

18. The method of claim 16 wherein determining the second factor comprises:
    determining the ownership level based on one or more of the following: a number of print devices owned by the user, a number of locations of the user where print devices are located, and a number of print devices at a location of the user.

19. The method of claim 18 wherein receiving a usage profile comprises:
    receiving a customer replaceable unit monitor; and
    retrieving a usage profile from the customer replaceable unit monitor.

* * * * *